March 13, 1962 R. MARINDIN 3,024,859
OVERLOAD RELEASE MEANS FOR TRACTORS HAVING
HYDRAULIC DRIVE TRANSMISSIONS
Filed Dec. 11, 1959

Inventor
Robert Marindin
Paul O. Pippel
Attorney

3,024,859
Patented Mar. 13, 1962

3,024,859
OVERLOAD RELEASE MEANS FOR TRACTORS HAVING HYDRAULIC DRIVE TRANSMISSIONS
Robert Marindin, Sprotborough, Doncaster, England, assignor to International Harvester Company, Chicago, Ill., a corporation of New Jersey
Filed Dec. 11, 1959, Ser. No. 858,902
Claims priority, application Great Britain Apr. 3, 1959
11 Claims. (Cl. 180—14.5)

This invention relates to drive transmissions for tractors, particularly agricultural tractors provided with a three-point implement-attaching linkage for mounting or coupling an earth-working implement, such as a plow thereon.

During the course of operation of tractors having agricultural implements or the like coupled thereto, obstructions, such as a tree, a root or a rock, are frequently encountered by the implement which may cause damage to the equipment unless suitable safeguards, such as overload releases or the like, are provided thereagainst.

Heretofore, various types of overload release means have been provided to guard against such hazards and it is to an improvement in such devices that the present invention is directed. In the type of drive mechanism that utilizes a clutch between the engine and the change-speed transmission of the tractor the problem of providing a suitable overload release is, of course, quite different from the problem encountered in a tractor equipped with an infinitely variable ratio drive transmission of the type having a hydraulic pump and motor system and embodying a variable delivery unit and wherein the pump is driven without the interposition of a clutch.

It is a primary object of the present invention, therefore, to provide simple and effective overload release means applicable for use with the type of drive transmissions embodying a hydraulic pump and motor system and whereby, on occurrence of overload, the hydraulic system is put out of action so as to interrupt the tractive effort of the vehicle.

Another object is to provide an improved overload release means applicable for use with drive transmissions wherein a variable hydraulic pump and motor system is used to provide or to control an infinitely variable ratio drive mechanism.

A further object is to provide in combination with a variable hydraulic pump and hydraulic motor system arranged to effect or to control drive at variable ratio between the engine and drive wheels of a tractor, means operable by movement of a draft-responsive member on occurrence of draft overload, for rendering the hydraulic system ineffective for transmitting or establishing drive to the driven wheels of the tractor.

Another object is to provide overload release means including a valve that controls an outlet from a pressure line between a hydraulic pump and a hydraulic motor, and wherein means responsive to movement of a draft-responsive member on occurrence of overload is operative for causing said valve to release fluid from said pressure line and thereby render the hydraulic system inactive.

A still further object is to provide, in a drive transmission of the type comprising a hydraulic pump unit and a hydraulic motor connected in circuit therewith and wherein at least one of said units is of the variable rate type, a coordinated assembly including a continuously driven priming pump connected to said circuit at the inlet side of the hydraulic pump unit, valve means in the connection to the priming pump for alternatively by-passing the output of the priming pump to a reservoir where said priming pump normally maintains a low pressure in the hydraulic circuit, a piston valve controlling an outlet from the pressure line between the hydraulic pump unit and the hydraulic motor unit and normally maintained closed by spring means, and a member operable by movement of a draft-responsive member on occurrence of overload to move said piston valve to an open position in which pressure fluid is released from the hydraulic circuit, the piston valve being thereafter maintained in the open position by pressure resulting from the low pressure maintained in the circuit by the priming pump until the valve in the outlet connection of the priming pump is operated to by-pass the delivery of the priming pump to the reservoir so that all pressure in the hydraulic circuit is released to permit closing of the piston valve.

The invention is hereinafter described, by way of example, with reference to the accompanying diagrammatic drawing, in which.

Figure 1:
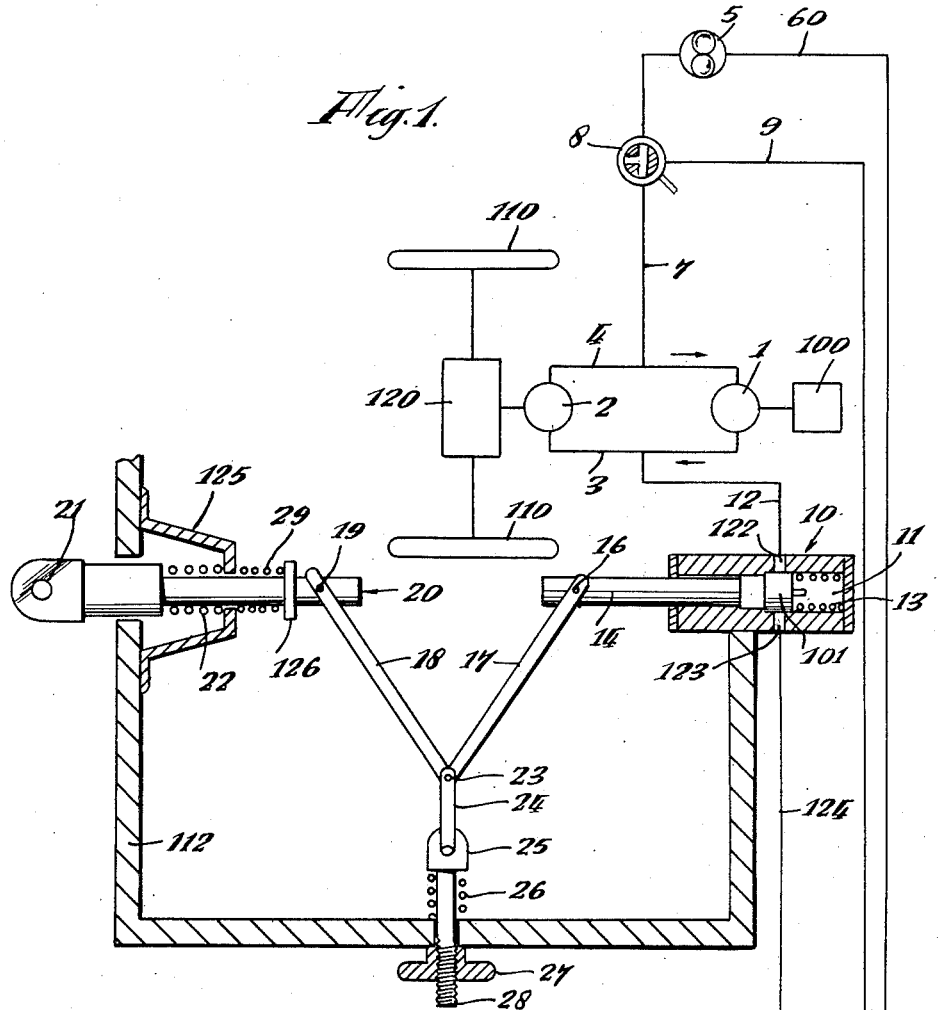
FIG. 1 is a simple lay-out illustrating the principles of the invention.

In the embodiment illustrated in FIG. 1, the invention is shown as applied to a hydraulic drive transmission comprising a hydraulic pump 1 driven by the tractor engine 100, and a variable delivery hydraulic motor 2 transmitting drive to the road wheels 110 of the tractor through conventional gearing 120. The hydraulic pump 1 is connected to the hydraulic motor by a pressure conduit 3 and a return conduit 4. A priming pump 5, which may be of the gear type and continuously driven by the tractor engine 100 through suitable driving mechanism (not shown), supplies fluid withdrawn through a conduit 60 from a reservoir, indicated at 6, through a conduit 7 to the return line 4 of the hydraulic circuit between the pump 1 and motor 2, the priming pump 5 being adapted to maintain a low pressure, for instance, 20 lbs. per square inch, in the hydraulic circuit. A manually operable valve 8 in the conduit 7 enables the delivery from the priming pump 5 to be alternatively by-passed through a conduit 9 to the reservoir 6.

The hydraulic pump 1 and motor 2 may be of any conventional construction utilizing the positive displacement type of units, and one such arrangement believed suitable for such purpose is the Motor Industry Research Association Hydrostatic Transmission Unit described and illustrated on pages 2, 3 and 4 in the October 25, 1957 issue of the "The Autocar" printed in England by Cornwall Press, Ltd., Paris Garden, London, S.E. 1.

Figure 2:
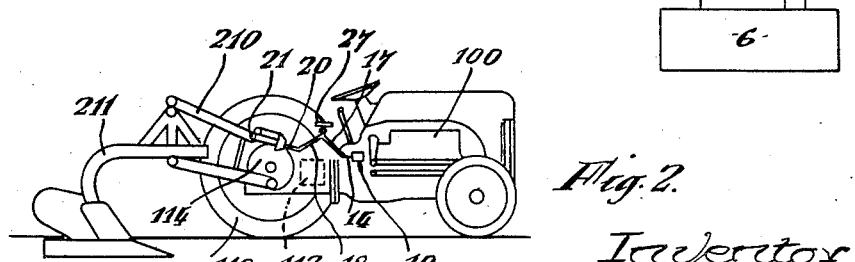
FIG. 2 is a side elevation of a tractor provided with a drive transmission and overload release means in accordance with the invention.

An overload release valve assembly 10 comprising a piston valve 101 slidable in a bore 11 controls an outlet conduit 12 communicating with the pressure conduit 3, the valve 101 normally being maintained in a position to close ports 122, 123, by means of a spring 13. The valve 101 is operable by a plunger 14 slidable in a bore 15 to open the ports 122, 123 to place the pressure conduit in communication with a return conduit 124 to the reservoir 6, the plunger 14 being pivotally connected at 16 to an adjustable linkage comprising toggle links 17, 18, the link 18 being pivotally connected at 19 to a draft-responsive member 20 adapted to be pivotally connected at 21 to the top link 210 (FIG. 2) of a three-point implement-attaching linkage carrying an implement such as a plow 211. The draft-responsive member 20 is influenced by a compression spring 22 engaging the abutment 125 and acting in opposition to the normal compressive draft load in the top link.

The common pivot 23 of the toggle links 17, 18 is connected, for example, through a link 24 to an adjustable member 25 which may be retracted against the action of a spring 26 by means of a hand-wheel 27 or the like engaging a screw-threaded shank portion 28 of the member 25 to vary the effective distance between the points 16 and 19. The spring 26 is sufficiently strong to prevent any retraction of the member 25 during operation of the plunger 14 by the draft-responsive member 20. The draft-responsive member 20, the adjustable member 25, and the overload release valve assembly 10 are supported relatively to one another by any suitable support means 112.

The arrangement described operates in the following manner:

In normal operation, the priming pump 5 maintains a low minimum pressure in the hydraulic circuit, and the main hydraulic pump 1 drives the hydraulic motor 2 at a ratio determined by the delivery rate to which the hydraulic motor and pump unit is adjusted. Compressive draft load exerted at the point 21 partially compresses the spring 22 and transmits movement to the plunger 14 through the linkage 17, 18. Under normal conditions, however, this movement is insufficient to operate the valve 101 in view of the initial clearance between the end of the plunger 14 and the valve 101. If excessive draft load occurs, for instance, due to an implement carried by the implement-attaching linkage encountering an obstruction, such as a hidden rock or tree root, the compressive load in the top link of the implement-attaching linkage will increase to such an extent that the spring 22 will be further compressed to allow the draft-responsive member 20, the links 17, 18 and the plunger 14, to move sufficiently to open the valve 101 so that hydraulic fluid under pressure in the pressure conduit 3 will be by-passed to the reservoir 6 through the conduit 12. Release of pressure fluid at high pressure from the pressure conduit 3 renders the hydraulic transmission inactive, under such circumstances the low pressure maintained, as a result of the priming pump 5 operating in series with the main hydraulic pump 1 which continues to be driven by the engine, will be ineffective for drive transmission purposes but serving to maintain sufficient pressure on the valve 101 to ensure that once the valve 101 is opened it will be maintained open against the action of the spring 13 so that the drive to the road wheels of the tractor will not be re-established until positive action is taken by the tractor operator to clear the obstruction. It will be understood, of course, that sufficient restriction will be provided in the exhaust connection from valve 10 to the reservoir to create a pressure which when acting on the end area of piston 101 will maintain the valve open.

In order to clear the obstruction, the hydraulic motor unit is put to reverse and the valve 8 is operated to by-pass delivery from the priming pump 5 to the reservoir 6 through the conduit 9. This relieves pressure on the valve 101 which will then be closed by the action of the spring 13. The valve 8 is then moved back to its original position so that delivery from the priming pump 5 primes the hydraulic circuit between the pump 1 and the motor 2, with the result that the pump 1 drives the motor 2 in the reverse direction to enable the implement to disengage from the obstruction and be lifted clear thereof. By adjusting the hand-wheel 27, the distance between the pivots 16 and 19 can be varied. If the distance between the pivots 16 and 19 is reduced, greater draft overload will be required to open the valve 101, while if the distance between the pivots 16 and 19 is increased, the valve 101 will be opened in response to less draft overload.

Some implements operate with the top link of a three-point linkage in tension, in which case overload resulting from the implement encountering an obstruction causes reduction intension in the top link. In order that the arrangement also will function with implements operating with the top link in tension, the draft-responsive member 20 is also influenced by a second spring 29 arranged to resist tension in the top link of a three-point linkage connected at 21 to the member 20. Normally, when the top link is in tension, the spring 29 is partially compressed between the abutment 125 and a collar 126 on the member 20. If an obstruction is encountered, the overload will reduce tension in the top link and consequently the draft-responsive member 20 will move to the right under the influence of the spring 29 sufficiently to cause opening of the valve 101.

The overload release means according to the invention may be used in conjunction with hydraulic lift control means according to the co-pending U.S. application, Serial No. 18,689 embodying a variable delivery hydraulic pump which is additional to the pump 1 and may be driven in unison therewith. Furthermore, the overload release means according to the invention may be used in conjunction with mechanism, e.g. single lever control mechanism, in accordance with the co-pending U.S. application, Serial No. 48,961 operating a hydraulic lift system with position control or automatic draft control as required.

It will be understood that the invention is not limited to the particular embodiment hereinbefore described. For example, the invention may be applied in a similar manner to a hydraulic pump and motor system in which both the pump and the motor, or either the pump or the motor, are variable. Furthermore, instead of providing a simple hydraulic transmission, the variable hydraulic pump and motor system may control epicyclic gearing in a manner known per se for transmitting drive from a tractor engine to road wheels at infinitely variable ratios. An example of such hydraulically controlled epicyclic gearing is the M.I.R.A. hydrostatic transmission unit described and illustrated in "The Autocar" of the October 25, 1957, and may be used, e.g. in the form of a unit 113 housed in the tractor structure between the engine 100 and the rear axle housing 114.

The adjustable means connecting the draft-responsive member and valve-operating member may be constructed and arranged in any other suitable manner.

I claim:

1. In a tractor having a power plant, tractor propelling means and an associated ground-engaging implement susceptible to movement upon being subjected to draft overload, a hydraulic pump connected to be driven by said power plant, a hydraulic motor and drive means connected between said motor and said tractor propelling means, high and low pressure hydraulic fluid-carrying conduits connected respectively between the outlet of said pump and the inlet of said motor and between the outlet of said motor and the inlet of said pump, a valve connected into said high pressure conduit and operable to vent high pressure fluid from said high pressure conduit, said valve being formed so that after the initial operation thereof it remains operated at a result of the flow of hydraulic fluid from said pump, and means operably connected to said implement and operative responsive to the subjection of said implement to a draft overload for initially operating said valve.

2. In a tractor having a power plant, tractor propelling means and an associated ground-engaging implement susceptible to movement upon being subjected to draft overload, a hydraulic pump connected to be driven by said power plant, a hydraulic motor and drive means connected between said motor and said tractor propelling means, high and low pressure hydraulic fluid-carrying conduits connected respectively between the outlet of said pump and the inlet of said motor and between the outlet of said motor and the inlet of said pump, fluid reservoir means, a valve connected between said high pressure conduit and said reservoir means and operable to vent high pressure hydraulic fluid from said high pressure conduit to said fluid reservoir means, said valve being formed so that after the initial operation thereof it remains operated as a result of the flow of hydraulic fluid from said pump, means operably connected to said implement and operative responsive to the subjection of said implement to a draft overload for initially operating said valve, and manually operable means connected into said low pressure conduit for selectively delivering hydraulic fluid under pressure to said low pressure conduit.

3. The combination recited in claim 2 and further characterized by having said manually operable means include a low pressure hydraulic pump with the inlet thereof connected by a conduit to said reservoir means, and a manually operable selector valve connected in fluid flow relation between the outlet of said low pressure hydraulic pump and said low pressure conduit and further having a conduit connecting said selector valve with said reservoir means, said latter valve being selectively operable in one position for delivering hydraulic fluid from said low pressure pump to said low pressure conduit and in another position for delivering hydraulic fluid from said low pressure pump to said reservoir means.

4. The combination according to claim 1, wherein the means operably connected to said implement and operative responsive to the subjection of said implement to a draft overload for initially operating said valve is adjustable within predetermined limits for modifying the amount of draft overload required to effect initial operation of said valve.

5. In a tractor having an engine, tractor propelling means, a draft-responsive mechanism attaching a ground-engaging implement to the tractor and which mechanism is susceptible to movement upon subjection of the implement to a draft overload, and drive-transmitting apparatus for driving the tractor including a hydraulic pump and a hydraulic motor interconnected in a circuit by fluid-carrying conduits and wherein said pump is connected to and driven by the tractor's engine for circulating hydraulic fluid under pressure through the hydraulic motor to effect the operation thereof and having means drivingly connecting the hydraulic motor to the tractor propelling means of the tractor to effect the movement thereof, a source of hydraulic fluid, and pressure means connecting said source with said circuit, the combination comprising: valve means normally biased to a closed position to prevent the flow of fluid therethrough; conduit means connecting said valve with said circuit and with said source of hydraulic fluid; motion-transmitting means connected between said draft-responsive mechanism and said valve and operative upon movement of said mechanism resulting from draft overload of said implement for opening said valve to permit the flow of hydraulic fluid from said circuit through said valve to said source.

6. In a tractor having an engine, tractor propelling means, a draft-responsive mechanism attaching a ground-engaging implement to the tractor and being susceptible to movement upon subjection to a draft overload, and drive-transmitting apparatus for driving the tractor including a hydraulic pump and a hydraulic motor interconnected in a circuit by fluid-carrying conduits and wherein said pump is connected to and driven by the tractor's engine for circulating hydraulic fluid under pressure through the hydraulic motor to effect the operation thereof and having means drivingly connecting the hydraulic motor to the tractor propelling means of the tractor to effect the movement thereof, a source of hydraulic fluid, and pressure means connecting said source with said circuit, the combination comprising: valve means connected in fluid flow relation between said circuit and said source of hydraulic fluid, said valve being normally biased to a closed position to prevent the flow of fluid therethrough, said valve being fashioned so that pressure resulting from the flow of hydraulic fluid therethrough is effective to maintain said valve open subsequent to the initial operation thereof; and motion-transmitting means connected between said draft-responsive mechanism and said valve and operative upon movement of said mechanism resulting from draft overload thereof for operating said valve to permit the flow of hydraulic fluid from said circuit through said valve to said source.

7. In a tractor having an engine, tractor propelling means, a draft-responsive mechanism attaching a ground-engaging implement to the tractor and being susceptible to movement upon subjection to a draft overload, and drive-transmitting apparatus for driving the tractor including a hydraulic pump and a hydraulic motor interconnected in a circuit by fluid-carrying conduits and wherein said pump is connected to and driven by the tractor's engine for circulating hydraulic fluid under pressure through the hydraulic motor to effect the operation thereof and having means drivingly connecting the hydraulic motor to the tractor propelling means of the tractor to effect the movement thereof, a source of hydraulic fluid, and pressure means connecting said source with said circuit, the combination comprising: valve means connected in fluid flow relation between said circuit and said source of hydraulic fluid, said valve being normally biased to a closed position to prevent the flow of fluid therethrough, said valve being fashioned so that pressure resulting from the flow of hydraulic fluid therethrough is effective to maintain said valve open subsequent to the initial operation thereof; motion-transmitting means connected between said draft-responsive mechanism and said valve and operative upon movement of said mechanism resulting from draft overload thereof for operating said valve to permit the flow of hydraulic fluid from said circuit through said valve to said source; and by-pass means connected between said pressure means and said circuit that is manually operative for alternatively by-passing the output of said pressure means to said source so as to remove pressure from said valve means.

8. The combination according to claim 6 and further characterized by having said motion-transmitting means manually adjustable for modifying the amount of draft overload necessary to effect initial operation of said valve.

9. A drive transmission of the type that includes, a hydraulic pump unit and a hydraulic motor unit connected in circuit with one another, at least one of said units having a variable delivery rate, a continuously driven priming pump connected to the hydraulic circuit at the inlet side of said hydraulic pump unit, valve means in the connection to the priming pump for alternatively by-passing the output of the priming pump to a reservoir, the priming pump normally maintaining a low pressure in the hydraulic circuit, a piston valve controlling an outlet from the pressure line between the hydraulic pump unit and the hydraulic motor unit, said piston valve normally being maintained closed by spring means, and a member operable by movement of a draft-responsive member on occurrence of overload to move said piston valve to an open position in which pressure fluid is released from the hydraulic circuit, the piston valve being thereafter maintained in the open position by pressure resulting from the low pressure maintained in the circuit by the priming pump until the valve in the outlet connection of the priming pump is operated to by-pass the delivery of the priming pump to the reservoir so that all pressure in the hydraulic circuit is released to permit closing of the piston valve.

10. A drive transmission according to claim 9, wherein the valve controlling release of fluid from the pressure line is operated by a movable member to which movement is transmitted from a draft-responsive member through adjustable mechanism arranged so that the amount of draft overload required to effect operation of the overload release means may be varied.

11. In a drive transmission of the type that includes a hydraulic system having a hydraulic pump unit and a hydraulic motor unit connected in a fluid-carrying circuit with one another, an overload release means comprising a valve controlling an outlet from a pressure line interconnecting the hydraulic pump and hydraulic motor, means operable responsive to movement of a draft-responsive device on occurrence of overload on the device for operating said valve to effect a release of fluid from said pressure line and render the hydraulic system inactive for operation of said hydraulic motor unit, means for maintaining a low pressure in said pressure line, spring means normally biasing said valve to a closed position and having said spring of such strength that once said valve is opened pressure from said low pressure means acting on the valve is operative to maintain said valve open against the action of said spring until the maintained low pressure is released by venting at a suitable point in the hydraulic system.

References Cited in the file of this patent
UNITED STATES PATENTS

| | | |
|---|---|---|
| 1,280,666 | Colwell | Oct. 8, 1918 |
| 2,394,210 | Sherman | Feb. 5, 1946 |
| 2,521,503 | Clark | Sept. 5, 1950 |
| 2,720,930 | Newhouse et al. | Oct. 18, 1955 |
| 2,790,365 | Bunting | Apr. 30, 1957 |